United States Patent Office 3,434,926
Patented Mar. 25, 1969

3,434,926
INDIRECT-CYCLE INTEGRAL STEAM COOLED
NUCLEAR REACTOR
Tetsuichiro Nakanishi, Tokyo, Japan, assignor to Hitachi
Zosen Kabushiki Kaisha, Osaka, Japan, a corporation
of Japan
Filed Aug. 11, 1965, Ser. No. 478,924
Int. Cl. G21b 19/28, 15/16, 15/02
U.S. Cl. 176—54                                5 Claims

ABSTRACT OF THE DISCLOSURE

A nuclear reactor comprises a reactor vessel containing water and composed of a vertical elongated pressure vessel which is composed of a cylindrical pressure shell having inlet nozzles. A reactor core is provided inside the vessel. This shell with enclosed tubes and pipes constitutes a shell and tube type heat exchanging means which is integrated with the reactor vessel. Steam generating is effected by directly contacting with water contained in the reactor vessel and thus the circulating steam always remains as steam until it reaches the water in the reactor vessel. Water heating and evaporating means is provided inside the reactor vessel. Means is provided inside the reactor vessel for superheating steam by passing it through passages in the reactor core. Secondary steam is generated from water derived from the shell side of the heat exchanging means. The steam is re-circulated. Thermal shields are provided inside the reactor vessel and a stream of water flows in contact with the thermal shields to moderate the nuclear fuel and may be circulated by a pump. The heat exchanging means may comprise two coils mounted inside the shell which are heated by superheated steam.

This invention relates to a nuclear reactor for either electrical power generation or ship propulsion purposes and more particularly to a steam cooled nuclear reactor moderated by either light or heavy water and also by their mixtures.

The reactor in accordance with this present invention is of the type known as an indirect cycle steam cooled. In such a reactor, the reactor coolant steam (primary steam) is circulated through heat exchangers where feed water is led and secondary steam is generated and superheated either for power or ship propulsion turbine supply.

The principal object of the present invention is to consolidate the steam generator, heat exchangers, and other equipments necessary for such an indirect cycle steam cooled reactor system and obtain a simple integrated structure and arrangement.

The reactor in accordance with this present invention is capable of producing superheated steam by a single steam cooled nuclear core by virtue of providing a primary system with a start-up and make-up steam generator equipped with conventional heating means to maintain a constant primary system pressure.

It is therefore a first object of this present invention to contain reactor core composed of nuclear fuel, coolant and moderator together with steam headers and secondary steam generators (heat exchangers) in a single pressure vessel which is also used for primary steam generation.

Another object of this invention is to provide a steam cooled reactor moderated by water contained in a primary steam generator and circulating through the reactor core, the said water temperature being controlled by electrical heating means provided at the bottom of the pressure vessel to either increase or decrease the reactivity of the reactor core in accordance with the variation of turbine load.

The third object of the present invention is to provide a steam cooled reactor whose feed water is heated by water contained in the pressure vessel, thus utilizing waste heat leaking out of the reactor core and at the same time keeping the water temperature substantially lower than the saturation temperature corresponding to the primary steam pressure to prevent boiling of the moderator water.

Another object of the present invention is to provide a steam cooled nuclear reactor provided with a core structure as shown in FIG. 4 to FIG. 7, capable of heating steam by internal and external surfaces of hollow fuel rods, the steam flow first being directed downwards through outer coolant passages, reversed direction 180° by lower ends and going through the center channels to preheat the incoming steam.

A further object of this invention is to provide a steam cooled nuclear reactor provided with a heat exchanger consisting of a primary steam compartment installed within the pressure vessel and secondary steam coils in the same compartment thus obtaining superheated steam heated by the reactor coolant steam.

A further object of the present invention is to provide a steam cooled nuclear reactor provided with steam plenum arrangements in which two steam plenums connected to reactor core outlets and inlet steam pipes respectively are both disposed in the steam space of the reactor vessel, thus minimizing heat losses and preventing drain accumulations.

Other objects and purposes of this invention will become more readily apparent from the following description of the invention taken with the illustrative embodiments shown in drawings, in which.

Referring more particularly to the drawings, and particularly to the embodiment shown in FIGS. 1–12, the preferred embodiments of this invention will now be described; however, this description will be understood to be illustrative of the invention and not as limiting it to the particular structures shown and described. A reactor in accordance with this invention is composed of a vertically elongated pressure vessel 22 consisting of a cylindrical pressure shell 24 provided with feed water inlet nozzles 26 and double pipe penetrations 28 for providing water inlets and outlets, a lower end plate 30 provided with electrical heaters 32 and a hemispherically shaped upper plenum 34 provided with superheated turbine steam outlets 36, double pipe penetrations 38 for providing primary steam outlets and inlets, and control rod penetrations 40. The shell 24 with its enclosed tubes and pipes and nozzles constitutes a shell and tube type heat exchanging means mounted inside and integrally with the reactor vessel 22.

The pressure shell 24 and the upper plenum 34 are connected with each other by a plurality of threaded studs 42. Within the vessel 22 is mounted an active core 50 and heat generated therefrom is removed by coolant steam led through first down-comers 52. The hot steam goes through first risers 54 and a superheated steam plenum 56 to a heat exchanger 60.

Feed water enters preheating coils 62 via feed intakes 64 by a plurality of pumps 66. The feed water heated by water contained in the vessel 22 is then led to evaporator and superheater coils 68 mounted within the heat exchanger 60 where second steam is generated and superheated by the first steam (coolant steam) and leaves the reactor vessel 22 via outlet pipes 70 for a main turbine. The reactor coolant steam desuperheated as it flows within the heat exchanger 60 is passed into the reactor core 50 via second risers 72, steam circulating pumps 74, second steam down-comers 76, a desuperheated steam plenum 78, and the first down-comers 52 and completes one cycle. Make up of the or initial start up coolant steam is generated by electric heaters 32, passed through a screen dryer 80, accumulated in a top space 82 within the upper plenum 34 and thence pumped into the reactor core 50 via intakes 84.

Figure 5:
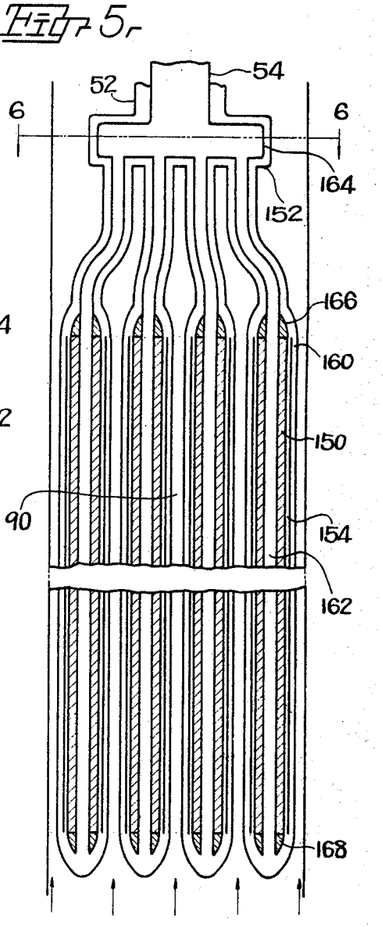
FIG. 5 is a greatly enlarged vertical section of the unit assembly shown in FIG. 4.
Figure 6:
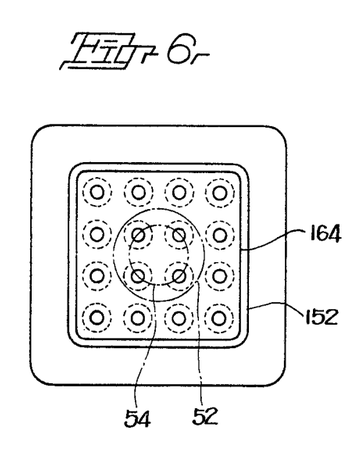
FIG. 6 is a greatly enlarged horizontal section taken along the line 6—6 of FIG. 5, showing a steam header.

The water 90 contained in the vessel 22 acts as moderator while it is in the reactor core 50. It flows upwards in the reactor core 50 and along the external surfaces of coolant passages 52 as shown in FIG. 5, enters water circulating pumps 92 via passages 94, returns to the vessel 22 via passages 96, being cooled by the feed water preheating coil 62 and flows into the core 50 via a bottom space 100.

The reactor core 50 is surrounded by thermal shields 102 and 104 and is supported by a bottom plate 106 which rests on mountings 108. The heat exchanger 60 is covered by a thermal insulator 110.

The reactivity of the core 50 is controlled by control rods 120 for start-up, shut-down and normal power adjustment. When a turbine load is decreasing in steady operation and secondary steam temperature is increasing beyond a predetermined value, the temperature increment is detected by feelers 122 so that the electric heaters 32 automatically enter into operation as soon as the information is conveyed thereto through electric wires 124. As the temperature of the water contained in the vessel 22 rises, the reactivity of the core 50 will decrease and overheating of nuclear fuel is prevented.

Figures 3, 4, 7:
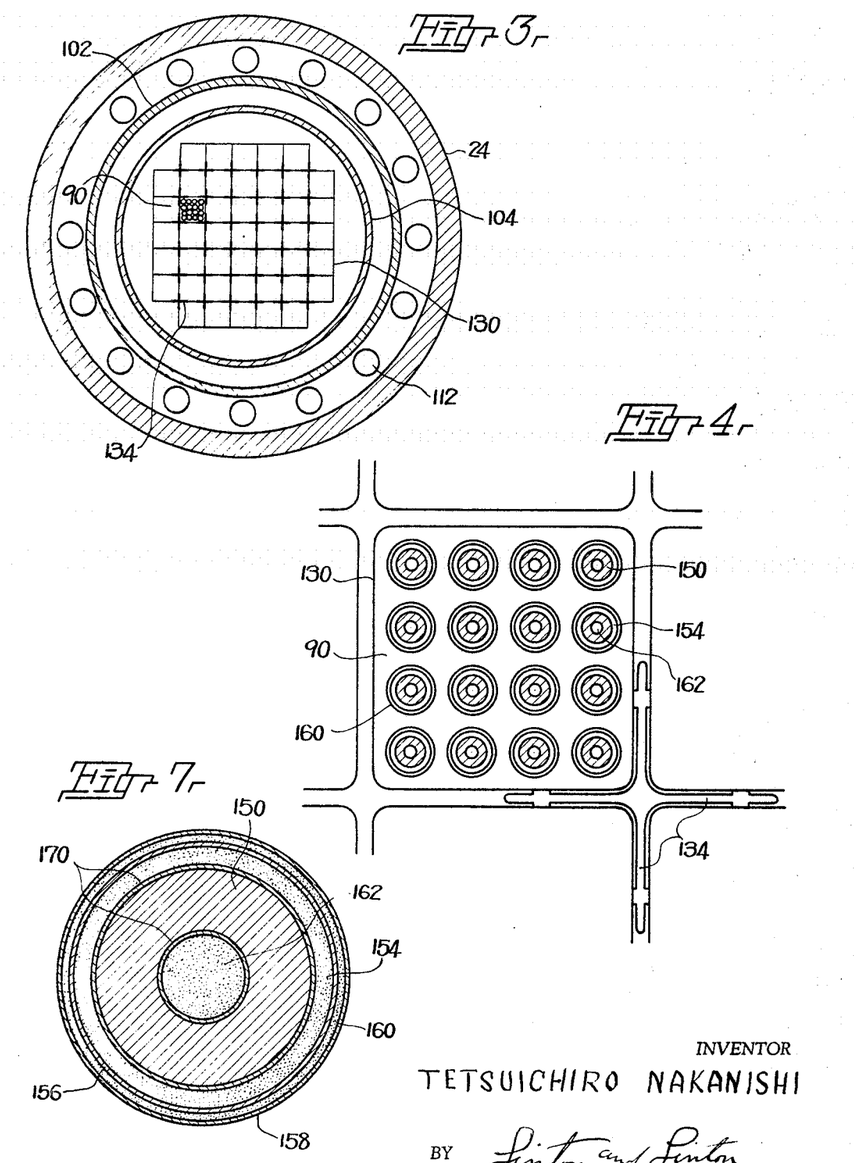
FIG. 3 is an enlarged horizontal section through the reactor taken along the line 3—3 of FIG. 2, showing partially the core structure.
FIG. 4 is a greatly enlarged horizontal section of a part of the reactor core of the reactor of FIG. 1 in which a unit assembly consisting of fuel elements, coolant passages, and moderator passages is shown together with a control rod.
FIG. 7 is a still further enlarged horizontal section of a coolant passage and fuel element shown in FIG. 5.

Referring now to FIG. 3 illustrating a horizontal section of the reactor core 50, reference numeral 24 represents the shell of the pressure vessel 22 and reference numerals 102 and 104 represent the thermal shields. Reference numeral 130 represents a unit assembly case of a rectangular shape shown as a non-limiting embodiment in FIG. 4. The unit assembly consists of fuel elements 150 and water 90 as moderator. Between two assembly cases 130 there is arranged a control rod blade 134. Four such blades 134 arranged in a cross shaped section are gathered into a control rod 120.

Referring now to FIGS. 4, 5, 6, and 7, for the same embodiments the nuclear heat generated from these fuel elements 150 is transferred to the steam coming down through the steam conduit means 52 via a first steam header 152 leading to double concentric tubes, each of which has an outer wall 156 and an intermediate wall 158 so that the steam coming down as above is led to two passages, an inner first steam passage 154 provided between the intermediate wall 158 and the external surface of the fuel element 150 and an outer second steam passage 160 provided between the outer wall 156 and the intermediate wall 158 of each of the double concentric tubes. Both the outer and intermediate walls 156 and 158 of the double concentric tube are made of anti-corrosive metal. Within the outer second steam passage 160 between the tube walls is a stagnant flow of steam introduced from and orificed at top inlets, which works as heat barrier to control heat transfer to moderator 90. At the bottoms of the inner first and outer second passages 154 and 160, the steam reverses direction 180 degrees and goes upwards through third steam passages 162 running axially through the fuel elements 150, respectively, removing heat from the internal surfaces of the fuel elements 150, and then reaches a second steam header 164. Reference numerals 166 and 168 represent guide pieces to obtain smooth flow. The steam thus superheated is collected by the superheated steam plenum 56 via passages 54 shown in FIG. 2.

The reactivity of the core 50 is controlled by control rods 120. External and hollow internal surfaces of the fuel elements 150 are covered by fuel cladding units 170 to prevent leaks to the coolant of gaseous fission products generated within nuclear fuels and protect fuels from chemical reaction of steam.

Figures 8, 9, 11:
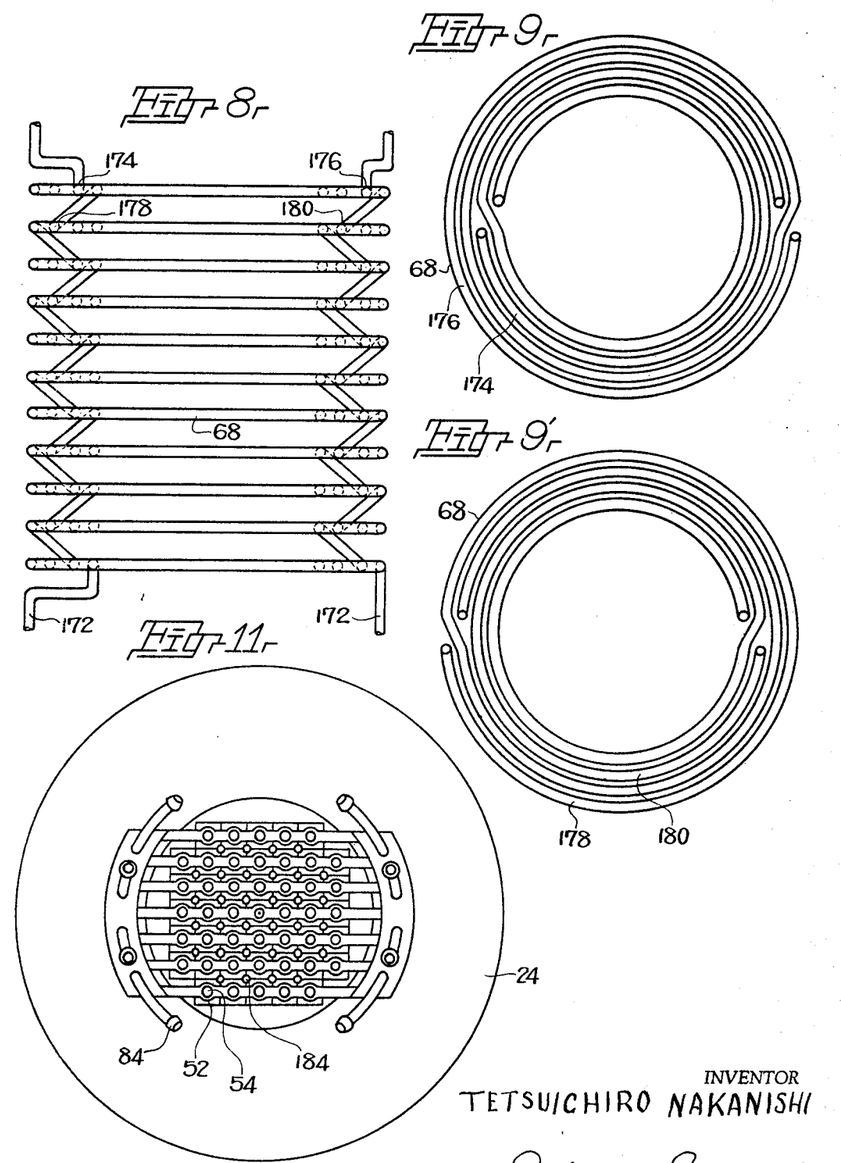
FIG. 8 is an enlarged elevation of turbine steam generating and superheating coils.
FIG. 9 and FIG. 9' are enlarged plan views of the even and odd rows respectively of the steam coils shown in FIG. 8.
FIG. 11 is an enlarged plan view of a lower header, an upper heater being removed.

Referring now to FIG. 8 which is an elevation of typical heating coils 68 (FIG. 1), after feed water has been heated by the preheating coils 62, it is admitted via inlets 172 to circular evaporator and superheater coils 68 piled within the heat exchanger 60 (FIG. 1) in multi-layers. An internal coil 174 and an external coil 176 are connected respectively to coils 178 and 180 disposed outside and inside respectively in the layer underneath, so that the total length of two coils are equal to each other approximately.

Figure 1:
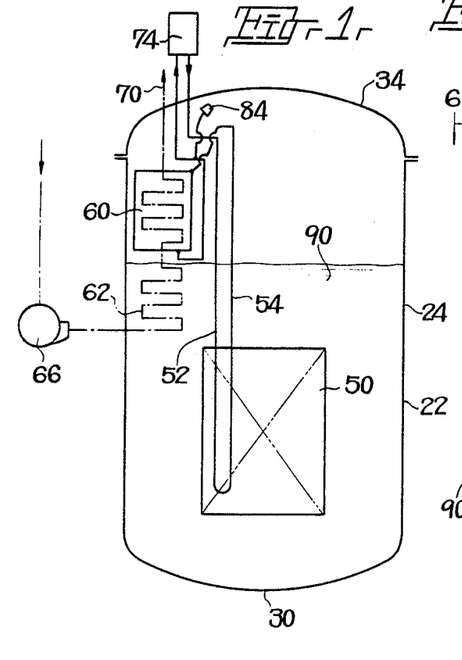
FIG. 1 is a diagram of a form of reactor embodying this invention.
Figure 10:
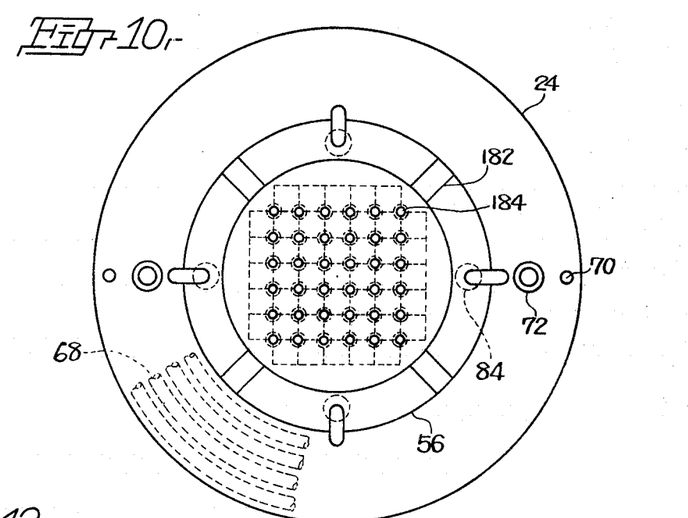
FIG. 10 is an enlarged plan view of a superheated steam plenum looking down from the top of the reactor vessel for the embodiment of FIG. 1.
Figure 12:
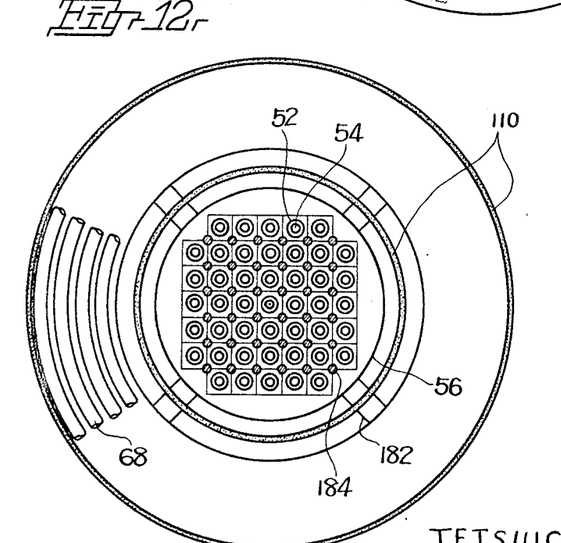
FIG. 12 is an enlarged bottom view of a desuperheated steam plenum looking up for the embodiment of FIG. 1.

Referring now to FIGS. 10, 11, and 12, for the embodiment of FIG. 1, the primary superheated steam collected by the superheated steam plenum 56 is passed to the heat exchanger 60 via steam conduit means 182 and desuperheated by secondary fluid flowing through the evaporator and superheater coils 68.

The saturated steam generated in the vessel 22 passes the screen dryer 80 and then enters the primary system through the intakes 84. The steam therefrom is pumped into the core 50 via the second steam risers 72, the steam pumps 74 (FIG. 2) and the first steam down-comers 52. The steam superheated in the core 50 enters the superheated steam plenum 56 through the first risers 54 disposed concentric to the first steam down-comers 52. The superheated steam plenum 56 is penetrated by control rod sheath pipes 184 accommodating the control rods 120, respectively. The heat exchanger 60 is provided with superheat steam outlet pipes 70 (FIG. 2) and covered by heat insulator 110.

In operation, for the embodiment of FIG. 1, to start up the reactor, at first the electric heaters 32 are energized by an external power source such as an emergency diesel electric generator to bring the temperature and pressure of the water 90 and steam in the reactor vessel 22 to predetermined values. In the meantime, while main secondary steam valves provided in the outlet pipes 70 leading to main and auxiliary turbines are closed, the primary water circulating pumps 92 are moved and the steam circulating pumps 74 are also driven to circulate steam taken from the intakes 84, through the primary steam circuit formed by the lower steam plenum 56, the down-comers 52, the core 50, the risers 54, the heat exchanger 60, and back to the steam pumps 74.

Thus, when the operating condition (pressure and temperature) has been reached, the control rods 120 are withdrawn to bring the reactor core 50 to critical condition and the secondary steam circuit is opened and the secondary steam generated in the heat exchanger 60 is supplied to the main and auxiliary turbines.

Figure 2:
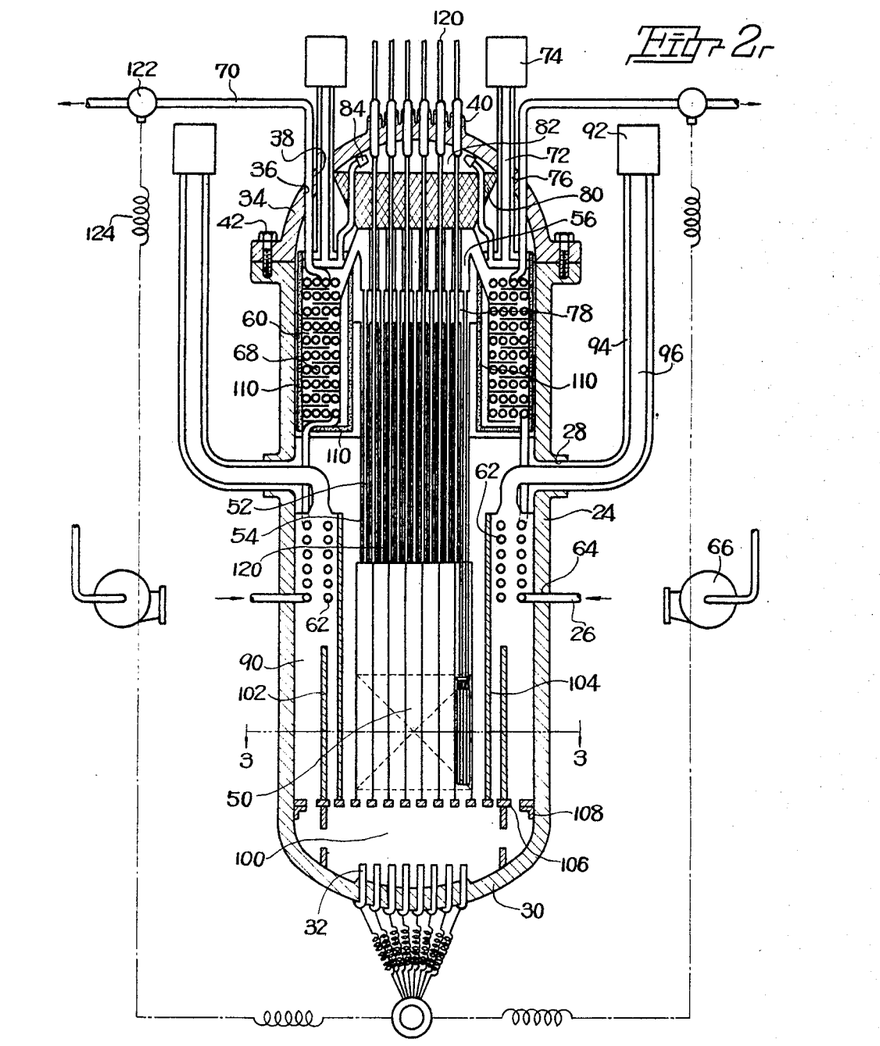
FIG. 2 is a vertical section through the reactor shown in FIG. 1, showing components schematically and partially in section.
Figures 13, 14:
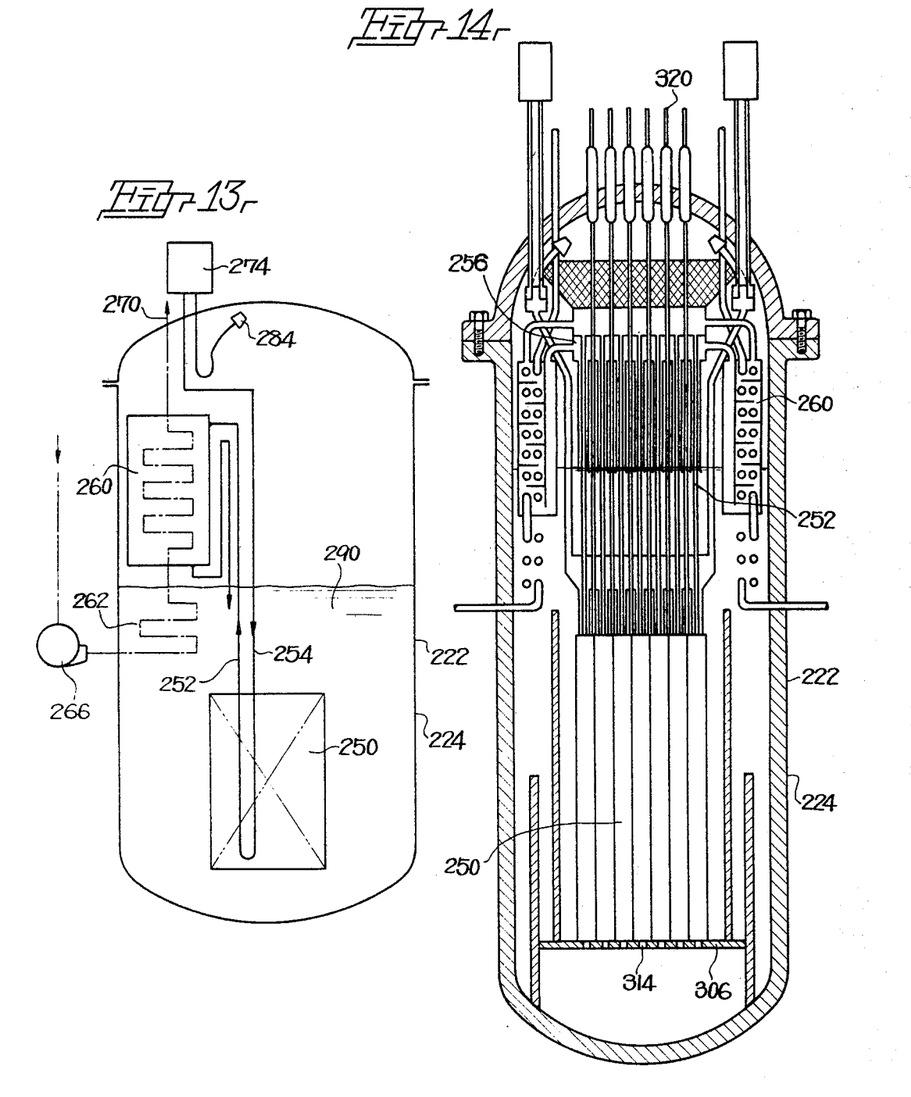
FIG. 13 is a diagram of a modification of the reactor shown in FIG. 1.
FIG. 14 is a vertical section through the form of the reactor shown in FIG. 13.

Referring now to FIG. 13 which illustrates a first modification of the reactor plant in accordance with this invention, the electric heaters 32 shown in FIG. 2 are removed and a part of the system is modified in such a manner that the primary steam leaving a secondary steam generator 260 is blown into the evaporator 222 thereby completely reducing the degree of superheat and generating saturated steam to be led into the core 250 of the reactor vessel 222.

Referring now to FIG. 14 which is a vertical section of a typical reactor of FIG. 13 to be used for the reactor plant as mentioned above, the heat exchanger 260 is installed within the reactor vessel 222 containing a core 250, and the primary steam leaving the heat exchanger 260 is blown into the water 290 contained in the reactor vessel 222 via annular steam passages 252 provided outside of primary steam channel 254 receiving the primary steam superheated by the reactor core 250. The reactor uses an auxiliary steam generator of the conventional type when used for ship propulsion or other purposes wher such separate steam evaporating means are available for plant start up. A three way valve is provided between the main turbine steam valve and the reactor steam (secondary) outlet so that the steam from an auxiliary boiler is introduced to the heat exchanger 260 to warm up the water in the reactor vessel 222 thus eliminating electric heaters.

Thus, to start up the reactor of the embodiment as shown in FIGS. 13 and 14, the steam generated by the auxiliary steam generator is blown into feed water coils 262 until the operating pressure and temperature are obtained within the reactor vessel 222. Thenceforth, the reactor core 250 is made critical by withdrawing control rods 320. Then the steam supply from the auixlary steam generator is stopped and the secondary steam generated in the heat exchanger 260 is used.

By virtue of this arrangement, the primary steam is completely desuperheated for one cycle, so that the temperature of the primary steam is never suddenly elevated even if a difficulty occurs in the turbine side such as a variation in load, and the fuel is prevented from overheating.

Figure 15:
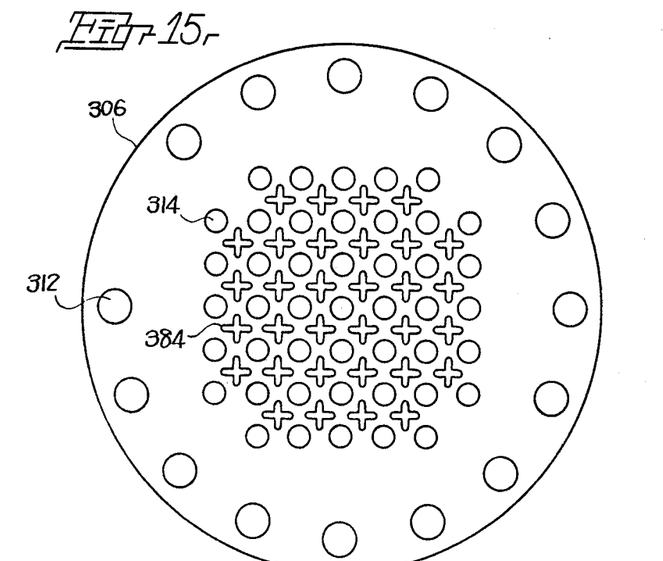
FIG. 15 is an enlarged plan view of a bottom plate shown in FIG. 14.
Figure 16:
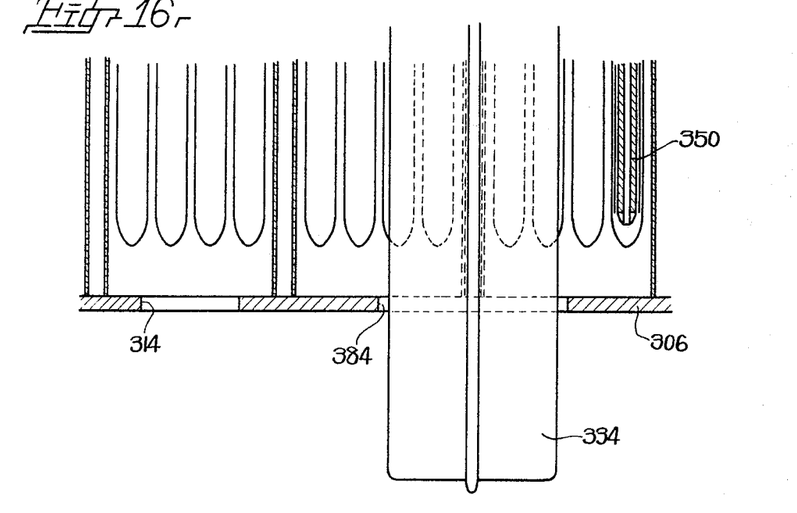
FIG. 16 for the modification of FIG. 13 is a still further enlarged partly sectional elevation of a part of the bottom plate showing also the control rod followers.

FIGS. 15 and 16 show a bottom plate 306 of this modification, of FIG. 13 which corresponds to the bottom plate 106 of the preceding embodiment. The bottom plate 306 is provided with bores 312 and 314 for passing water 290 and also perforations 384 adapted to pass the cross shaped control rod blades 334 provided with followers, respectively.

Figures 17, 18, 19:
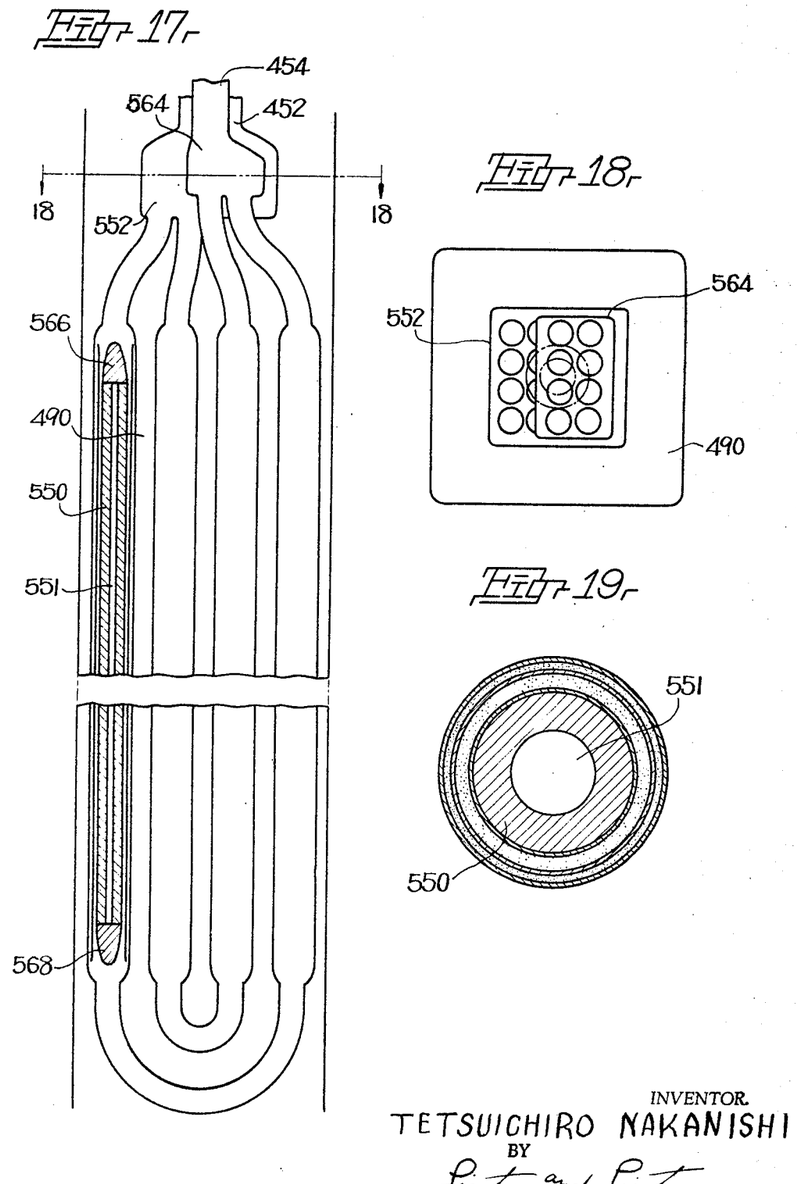
FIG. 17 is a view similar to FIG. 5 but showing still another modification.
FIG. 18 is a view similar to FIG. 6 but showing last mentioned modification.
FIG. 19 is a view similar to FIG. 7 but showing the modification of FIG. 17.

Reference is now made to FIGS. 17, 18, and 19, which illustrate another further modification of this invention. In this modification, fuel elements 550 of the core have axial hollow spaces 551, respectively. The hollow space 551 is closed by steam guide pieces 566 and 568 at both ends to form a sealed space prepared for avoiding overheating and fill the same with fission gas. Although steam coming down through the first down-comer 52 is divided into two streams, led to the inner first steam passage 154 and the outer second steam passage 160 arranged both around a single fuel element 150, and then gathered and led to the third steam passage 162 formed inside the same fuel element 150 in the preceding embodiments as shown in FIGS. 5 and 7, in this embodiment shown in FIGS. 17, 18 and 19, a system includes two fuel elements 550: That is, steam coming down from a first down-comer 452 is led through a first steam header 552 to inner first steam passages and outer second steam passages, each provided around a fuel element 550. An inner first steam passage and an outer second steam passage are gathered again at the bottom thereof and directed to a third steam passage formed around another fuel element which has not such down-coming passages, whence the steam is led to a first riser 454 through a second steam header 564.

Having now described and illustrated my invention, I wish it to be understood that my invention is not to be limited to the specific forms and arrangements of parts herein stated and shown, or specifically covered by the appended claims.

What I claim is:

1. A nuclear reactor comprising a reactor vessel adapted to be filled up with water to a predetermined level; a nuclear reactor core mounted inside said reactor vessel, of which the top is arranged below said level, and in which a nuclear fuel is disposed; a water heating and evaporating means mounted inside said reactor vessel and below said nuclear reactor core and externally energized to heat and evaporate said water for generating primary steam; a primary steam superheating means mounted inside said reactor vessel and comprising a number of steam passages mounted passing through said nuclear reactor core and in contact with said nuclear fuel to cool said nuclear fuel by said primary steam and superheat said primary steam by said nuclear fuel; a shell and tube type heat exchanging means mounted inside and integrally with said reactor vessel; a first conduit means extending from steam outlets of said steam passages to the shell side of said heat exchanging means to admit said superheated primary steam into said shell side whereby said superheated primary steam is desuperheated by water separately pumped into the tube side of said heat exchanging means and secondary steam is generated from the last named water in said tube side, a steam circulating means adapted to forcibly pump said desuperheated primary steam; a second conduit means extending from said shell side of said heat exchanging means to said steam circulating means to admit said desuperheated primary steam to said steam circulating means, and a third conduit means extending from said steam circulating means to steam inlets of said steam passages to superheat and recirculate said primary steam.

2. A nuclear reactor as claimed in claim 1, and thermal shilds provided inside said reactor vessel and adapted to moderate said nuclear fuel, and connections whereby said water separately pumped into the tube side of said heat exchanging means flows upwards around said steam passages and inside said thermal shields and whereby said water flows downwards outside said thermal shields to be circulated by natural circulation.

3. A nuclear reactor as claimed in claim 1, and thermal shields provided inside said reactor vessel and adapted to moderate said nuclear fuel, water pumping means adapted and connected to circulate said water separately pumped into the tube side of said heat exchanging means and cause it to flow downward outside said thermal shields, and connections to cause said water to flow upwards around said steam passages and inside said thermal shields.

4. A nuclear reactor as claimed in claim 1, in which said nuclear reactor core comprises a plurality of vertically elongated unit assemblies, each comprising a plurality of fuel elements and moderating water, each of said fuel elements comprising a hollow cylindrical rod surrounded by two concentric passages and provided with a central passage, said two concentric passages being adapted to receive said pumped primary steam from said third conduit means, a steam flow reversing means provided at the bottom end of said fuel element to change the direction of steam flow 180° and connect the bottom ends of said two concentric passages with the bottom end of said central passage so that said pumped primary steam is transferred from said two concentric passages to said central passage, through which said primary steam is admitted into said first conduit means.

5. A nuclear reactor is claimed in claim 1, in which said shell and tube type heat exchanging means comprise a shell and two coils, said shell being integrated with said reactor vessel, said two coils being mounted inside said shell, one of said two coils being arranged outside of the other of said two coils in alternate horizontal layers so as to equalize the lengths of said two coils, said shell side being formed between said shell and said two coils and being adapted to receive said superheated primary steam from said first conduit means, to heat said two coils, and to admit desuperheated primary steam into said second conduit means, and connections to connect said two coils to receive fresh preheated water which is heated and evaporated into secondary steam by said superheated primary steam in said two coils, and auxiliary means adapted and connected to admit and receive said secondary steam provided out of said reactor vessel.

References Cited

UNITED STATES PATENTS

| 3,069,341 | 12/1962 | Daniels | 176—55 |
| 3,085,964 | 4/1963 | Ritz et al. | 176—60 |
| 3,108,938 | 10/1963 | Nettel et al. | 176—59 |
| 3,170,846 | 2/1965 | Blumberg | 176—53 |

CARL D. QUARFORTH, *Primary Examiner.*

R. L. GRUDZIECKI, *Assistant Examiner.*